J. C. CRITCHETT.
SIGHT FOR FIREARMS.
APPLICATION FILED JULY 20, 1915.
1,190,121. Patented July 4, 1916.
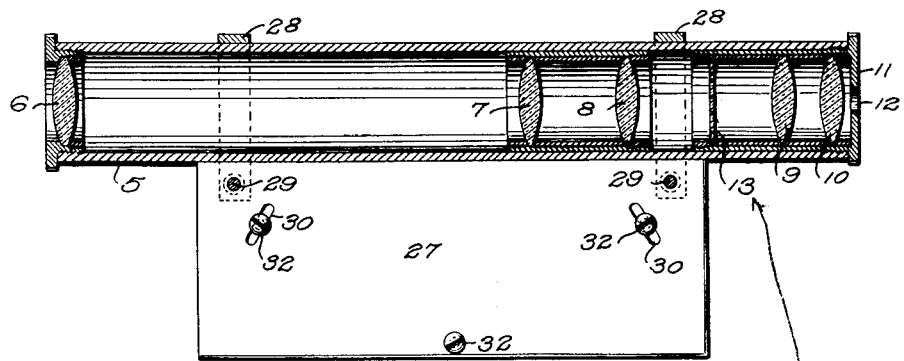
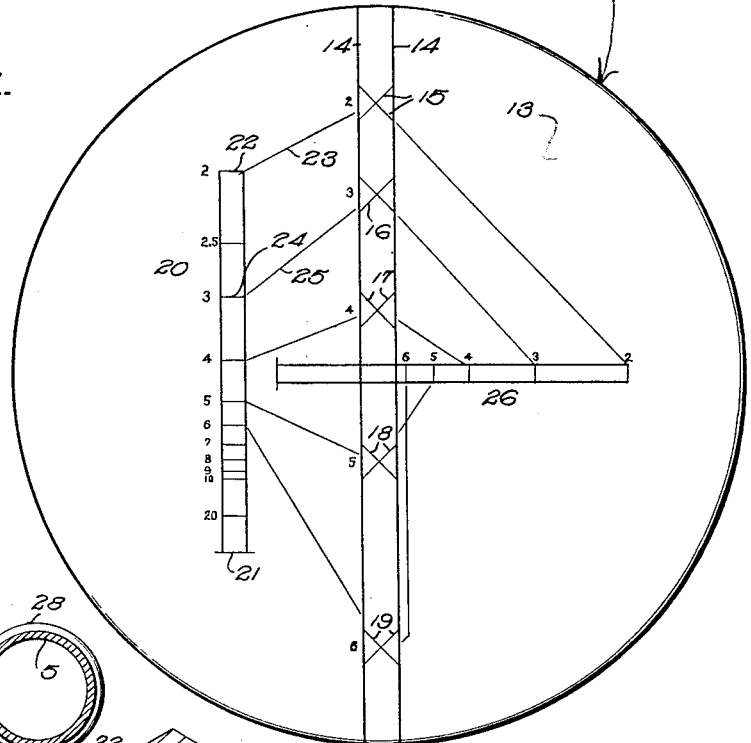
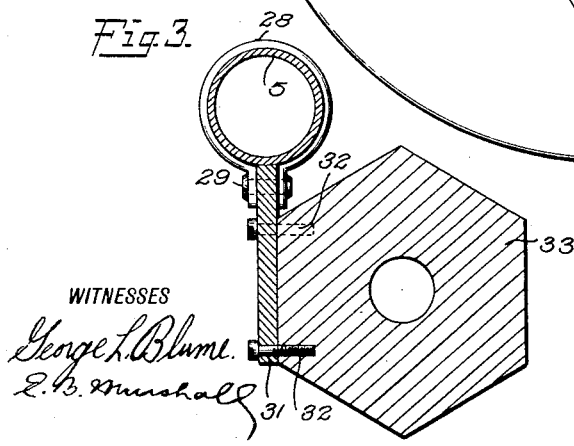
WITNESSES
George L. Blume.
E. B. Marshall
INVENTOR
James C. Critchett
BY Munn & Co.
ATTORNEYS

UNITED STATES PATENT OFFICE.

JAMES CLYDE CRITCHETT, OF EL PASO, TEXAS.

SIGHT FOR FIREARMS.

1,190,121. Specification of Letters Patent. Patented July 4, 1916.

Application filed July 20, 1915. Serial No. 40,865.

*To all whom it may concern:*

Be it known that I, JAMES CLYDE CRITCHETT, a citizen of the United States, and a resident of El Paso, in the county of El Paso and State of Texas, have invented a new and Improved Sight for Firearms, of which the following is a full, clear, and exact description.

My invention has for its object to provide a sight for firearms having a transparent member on which are indicated a plurality of sighting marks and a scale which may be compared with the outline of an object to determine which sighting mark is to be used when firing at the object.

Additional objects of the invention will appear in the following specification in which the preferred form of my invention is disclosed.

In the drawings similar reference characters refer to similar parts in all the views in which—

Figure 1 is a longitudinal sectional view of my firearm sight; Fig. 2 is an enlarged front view of the transparent member on which are indicated the sighting marks and the scale; and Fig. 3 is a sectional view of Fig. 1.

By referring to the drawings it will be seen that the firearm sight is provided with a tube 5 in which are mounted lenses 6, 7, 8, 9 and 10 in a manner similar to the arrangement of the lenses in a terrestrial telescope such as are made use of by surveyors. At one end of the tube 5 there is an eyepiece 11 with an opening 12 for sighting purposes. In this tube 5 there is mounted a glass or other transparent member 13, two vertical parallel lines 14 being indicated on this transparent member 13, the lines 14 being spaced apart and being connected by crossed lines 15, 16, 17, 18 and 19, the said crossed lines being used for sighting purposes in connection with the opening 12 of the eye piece 11. The crossed lines 15 are made use of as a sight when firing at objects 200 yards away; the crossed lines 16 are made use of when firing at objects 300 yards; the crossed lines 17 are made use of when firing at objects 400 yards; the crossed lines 18 are made use of when firing at objects 500 yards, and the crossed lines 19 are made use of when firing at objects 600 yards. At the left of the parallel lines 14 there is a scale 20 which is arranged with reference to the lenses to determine the distance of objects of a known size. I prefer to arrange this scale with reference to the height of a man so that when the bottom or base line 21 of the scale is positioned to coincide with the feet of a man and the top of the head of the man is at the scale line 22, it will be known that the man is at a distance of 200 yards, the line 23 referring to the sighting crossed lines 15 so that the marksman will know immediately that the crossed lines 15 are to be used when firing at the man. If, when the feet of the man are covered by the line 21, the top of the man's head is at the line 24, the line 26 will indicate to the marksman that the crossed lines 16 are to be used when firing at the man who is at a distance of 300 yards. When objects larger than a man are to be fired at, the distance may be determined with a knowledge of their size relatively to the size of a man, when the marksman covers them with the scale 20 in the manner described.

When firing at a deer, the length of which is approximately the same as a man, the horizontal scale 26 is made use of in a way similar to the manner in which the scale 20 is used.

The tube 5 is mounted on a plate 27 by means of collars 28 and screws or rivets 29, this plate 27 having slots 30 and an orifice 31 through which screws 32 are disposed, these screws 32 being provided for securing the plate 27 to the side of a rifle barrel 33 or frame of rifle.

Having thus described my invention I claim as new and desire to secure by Letters Patent:

1. A sight for firearms having a plurality of sighting marks, and a scale adjacent thereto and having a base line and marks spaced apart referring to sighting marks to indicate which sighting mark is to be used when the outline of an object of known size is substantially inclosed within said base line and one of the marks on the scale.

2. A sight for firearms having a plurality of sighting marks spaced apart from one end, and a scale adjacent thereto with marks spaced apart from one end, the distance between the sighting marks increasing from the said end relatively to the distances between the scale marks from the said end of the scale.

3. In a sight for firearms, a tube having lenses and a transparent member fixed therein, there being indicated on the transparent member a plurality of sighting marks and corresponding scale marks, it being possible to compare the scale with the outline of an object to determine the sighting mark to be used when firing at the object.

4. A sight for firearms having a plurality of sighting marks spaced apart over each other, and a scale having marks corresponding to the sighting marks and spaced apart over each other, the distances between the sighting marks increasing downwardly relatively to the distances between the scale marks.

5. A sight for firearms having a plurality of sighting marks spaced apart over each other, and a scale having marks corresponding with the sighting marks, the distance between the sighting marks increasing downwardly relatively to the distances between the corresponding scale marks.

6. A sight for firearms having a transparent member with a plurality of sighting marks spaced apart over each other, a scale having marks corresponding with the sighting marks, distances between the sighting marks increasing downwardly relatively to the distances between the corresponding scale marks.

7. In a sight for firearms, a tube having lenses and a transparent member fixed therein, the transparent member having indicated thereon sighting marks spaced apart over each other, and a scale having marks which correspond with the sighting marks, distances between the sighting marks increasing downwardly relatively to the distances between the corresponding scale marks.

In testimony whereof I have signed my name to this specification in the presence of the two subscribing witnesses.

JAMES CLYDE CRITCHETT.

Witnesses:
J. W. EUBANK,
E. B. McCLINTOCK.

Copies of this patent may be obtained for five cents each, by addressing the "Commissioner of Patents, Washington, D. C."